US006971510B2

(12) United States Patent
Cotter et al.

(10) Patent No.: US 6,971,510 B2
(45) Date of Patent: Dec. 6, 2005

(54) CURVED BELT CONVEYOR

(75) Inventors: David H. Cotter, Coopersville, MI (US); Kenneth J. Kooistra, Byron Center, MI (US); Thomas J. Pelak, Grand Rapids, MI (US); Richard E. Hoisington, II, Farmington, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 40 days.

(21) Appl. No.: 10/411,757

(22) Filed: Apr. 11, 2003

(65) Prior Publication Data

US 2003/0192769 A1 Oct. 16, 2003

Related U.S. Application Data

(60) Provisional application No. 60/420,847, filed on Oct. 24, 2002, provisional application No. 60/389,030, filed on Jun. 14, 2002, and provisional application No. 60/372,075, filed on Apr. 12, 2002.

(51) Int. Cl.⁷ .............................................. B65G 15/02
(52) U.S. Cl. ....................... 198/831; 198/806; 198/606
(58) Field of Search ............................ 198/606, 806, 198/831

(56) References Cited

U.S. PATENT DOCUMENTS

| ,735,722 A | | 8/1903 | Dennis ................. 198/860.1 |
| 1,254,941 A | * | 1/1918 | Snow ........................ 198/831 |
| 1,578,303 A | | 3/1926 | Walter et al. ............ 198/860.1 |
| 1,698,786 A | | 1/1929 | Finn .......................... 198/606 |
| 1,972,753 A | | 9/1934 | Bausman ................... 198/815 |
| 2,320,667 A | | 6/1943 | Smith ........................ 198/312 |
| 2,619,222 A | | 11/1952 | Przybylski ................. 198/816 |
| 2,725,757 A | | 12/1955 | Murphy ..................... 198/806 |
| 3,044,603 A | * | 7/1962 | Fry ............................ 198/831 |
| 3,189,165 A | * | 6/1965 | Theismeijer ............... 198/816 |

(Continued)

FOREIGN PATENT DOCUMENTS

| DD | 520826 | 3/1931 | |
| DD | 1133302 | 7/1962 | |
| EP | 625372 A2 | 4/1994 | .......... B02C/15/14 |
| FR | 1450328 | 10/1965 | |
| GB | 829807 | 5/1957 | .......... B65G/78/01 |
| JP | 02087563 | 3/2002 | |
| WO | WO9930993 | 6/1999 | .......... B65G/37/00 |

Primary Examiner—Douglas Hess
(74) Attorney, Agent, or Firm—Van Dyke, Gardner, Linn & Burkhart, LLP

(57) ABSTRACT

A curved belt conveyor includes at least two zones, each of which may be defined by a motorized roller and at least one idler roller which are positioned along and between opposite sidewalls of the conveyor, and a continuous belt reeved around the rollers. The conveyor includes a tracking means for tracking the belt on the rollers. The tracking means is substantially contained between the sidewalls of the conveyor and laterally inward of the outer and inner ends of the rollers. The tracking means may comprise a tracking roller positioned along a lower surface of one of the rollers and may engage the lower run of the belt with an upper surface of the tracking roller to maintain the belt in a proper position around the rollers.

52 Claims, 10 Drawing Sheets

U.S. PATENT DOCUMENTS

| | | | |
|---|---|---|---|
| 3,214,007 A | 10/1965 | Matthies et al. | 198/852 |
| 3,217,861 A | 11/1965 | Daniluk et al. | 198/816 |
| 3,237,754 A * | 3/1966 | Freitag et al. | 198/831 |
| 3,661,244 A | 5/1972 | Koyama | 198/184 |
| 3,854,575 A * | 12/1974 | Fraioli, Sr. | 198/831 |
| 3,901,379 A | 8/1975 | Bruhm | 198/182 |
| 4,196,804 A * | 4/1980 | Hecketsweiler et al. | 198/813 |
| 4,203,512 A | 5/1980 | Ammeraal | 198/594 |
| 4,724,953 A | 2/1988 | Winchester | 198/836 |
| 4,846,338 A | 7/1989 | Widmer | 198/831 |
| 4,887,708 A * | 12/1989 | Brown et al. | 198/831 |
| 4,930,621 A * | 6/1990 | Brown et al. | 198/831 |
| 4,955,466 A | 9/1990 | Almes et al. | 198/831 |
| 5,056,655 A | 10/1991 | Justice | 198/812 |
| 5,299,674 A | 4/1994 | Cusitar | 198/303 |
| 5,332,082 A | 7/1994 | Sommerfield | 198/831 |
| 5,360,102 A | 11/1994 | Schoning | 198/831 |
| 5,439,098 A * | 8/1995 | Bonnet | 198/831 |
| 5,456,349 A | 10/1995 | Axmann | 198/831 |
| 5,667,058 A * | 9/1997 | Bonnet | 198/831 |
| 5,682,975 A | 11/1997 | Wells | 198/831 |
| 5,722,531 A * | 3/1998 | Zimny et al. | 198/831 |
| 5,839,570 A | 11/1998 | Vertogen et al. | 198/831 |
| 5,857,559 A * | 1/1999 | Gianvito et al. | 198/831 |
| 5,860,512 A * | 1/1999 | Gianvito et al. | 198/841 |
| 5,944,171 A * | 8/1999 | Vertogen et al. | 198/837 |
| 5,984,084 A | 11/1999 | Osaka et al. | 198/831 |
| 5,988,362 A | 11/1999 | Nakamura et al. | 198/831 |
| 5,992,615 A | 11/1999 | Muchalov | 198/831 |
| 6,053,306 A | 4/2000 | Osaka et al. | 198/831 |
| 6,085,895 A | 7/2000 | Osaka et al. | 198/831 |
| 6,098,790 A * | 8/2000 | Warnecke | 198/831 |
| 6,105,755 A | 8/2000 | Muchalov | 198/831 |
| D460,239 S | 7/2002 | Nimmo et al. | D34/35 |
| 6,412,623 B2 | 7/2002 | Axmann et al. | 198/791 |
| 6,484,871 B2 * | 11/2002 | van Leeuwen | 198/831 |
| 6,523,665 B2 * | 2/2003 | Nimmo et al. | 193/35 R |

* cited by examiner

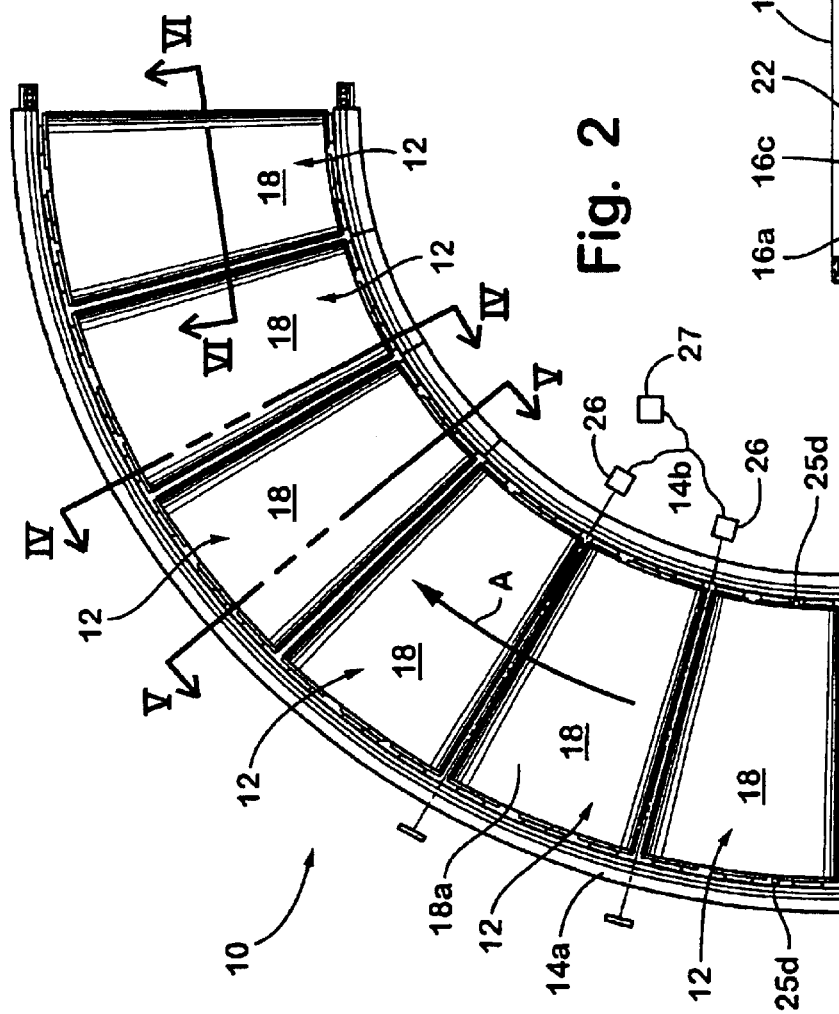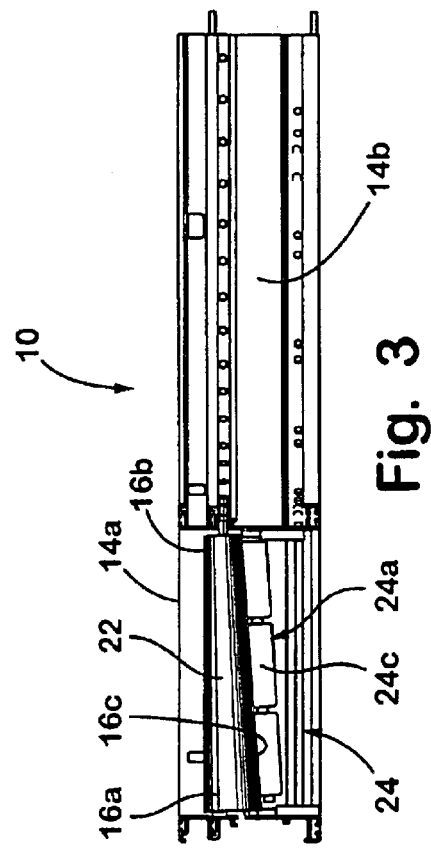

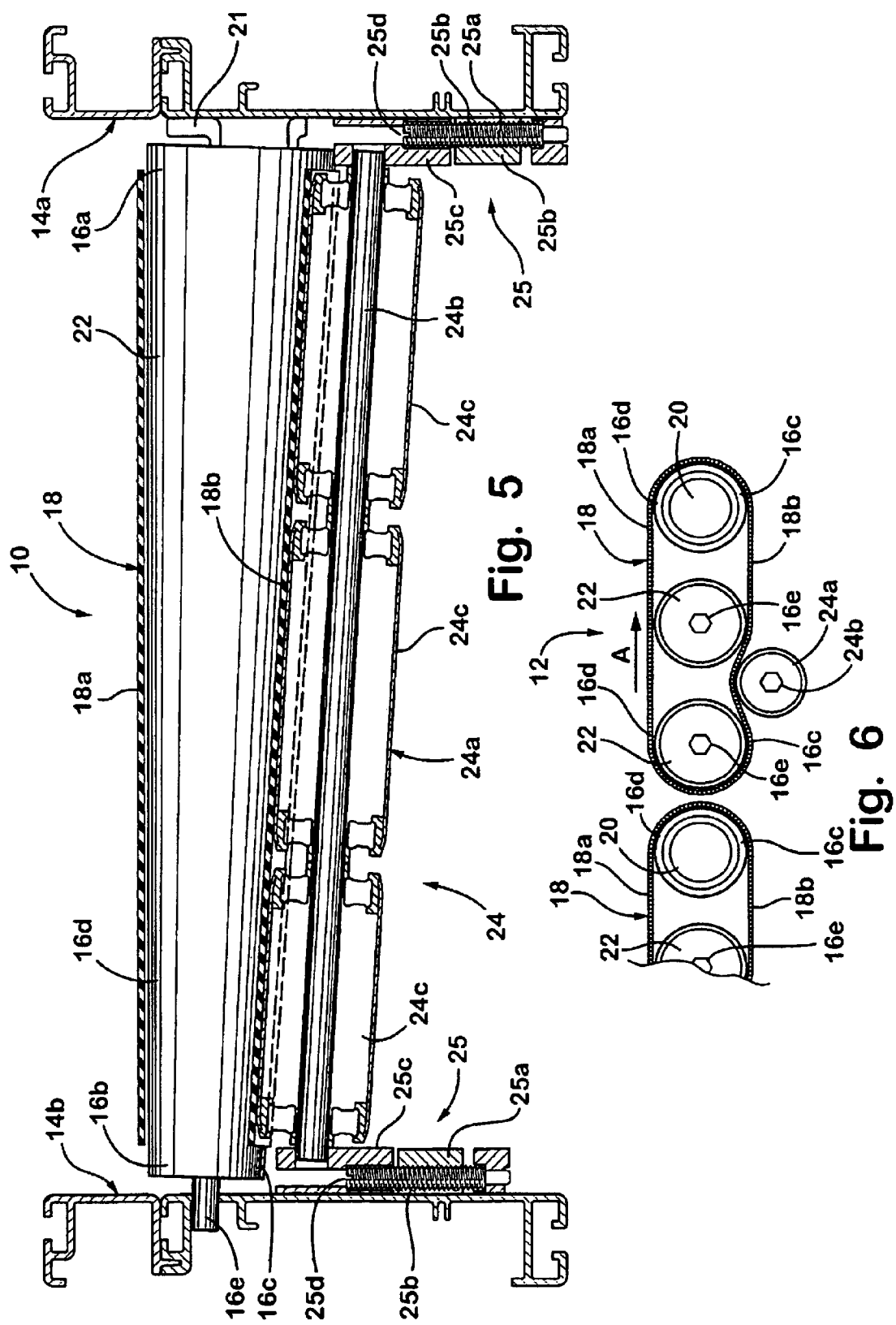

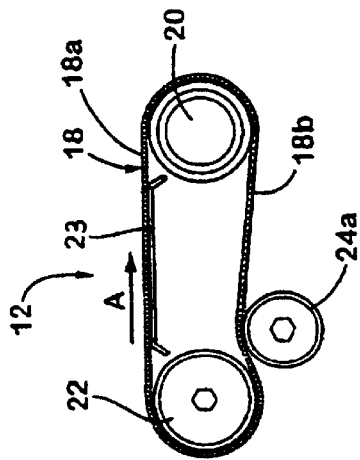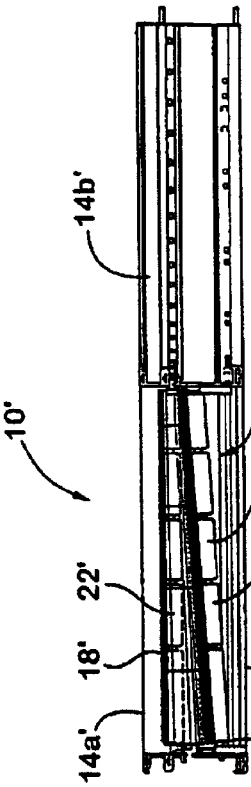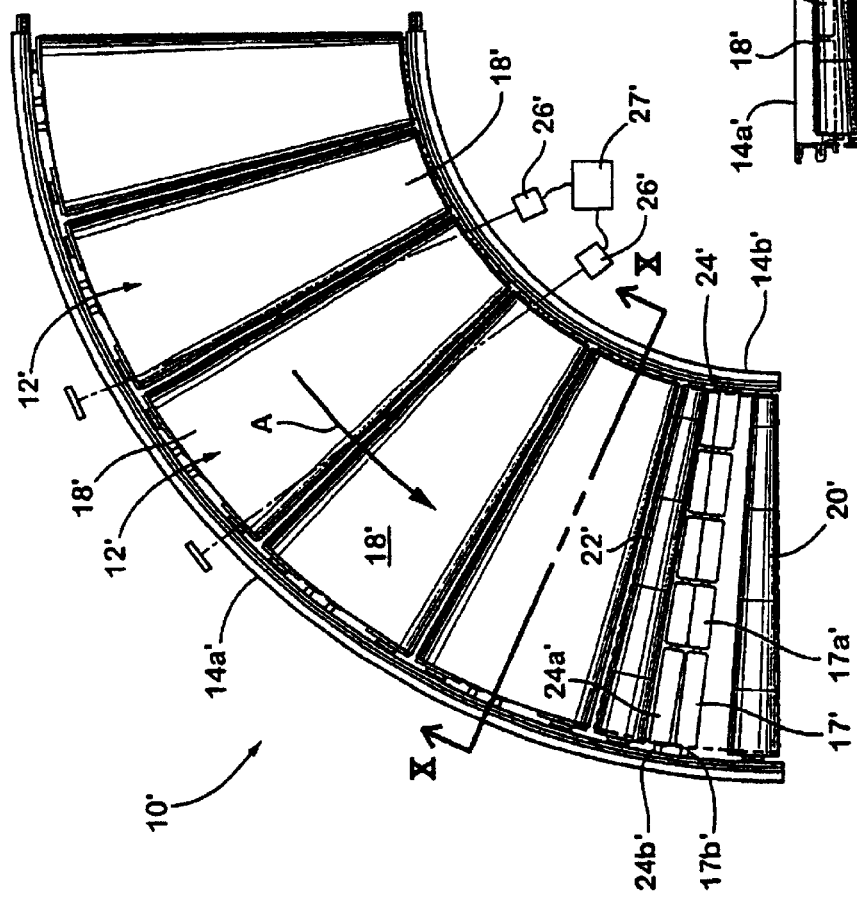

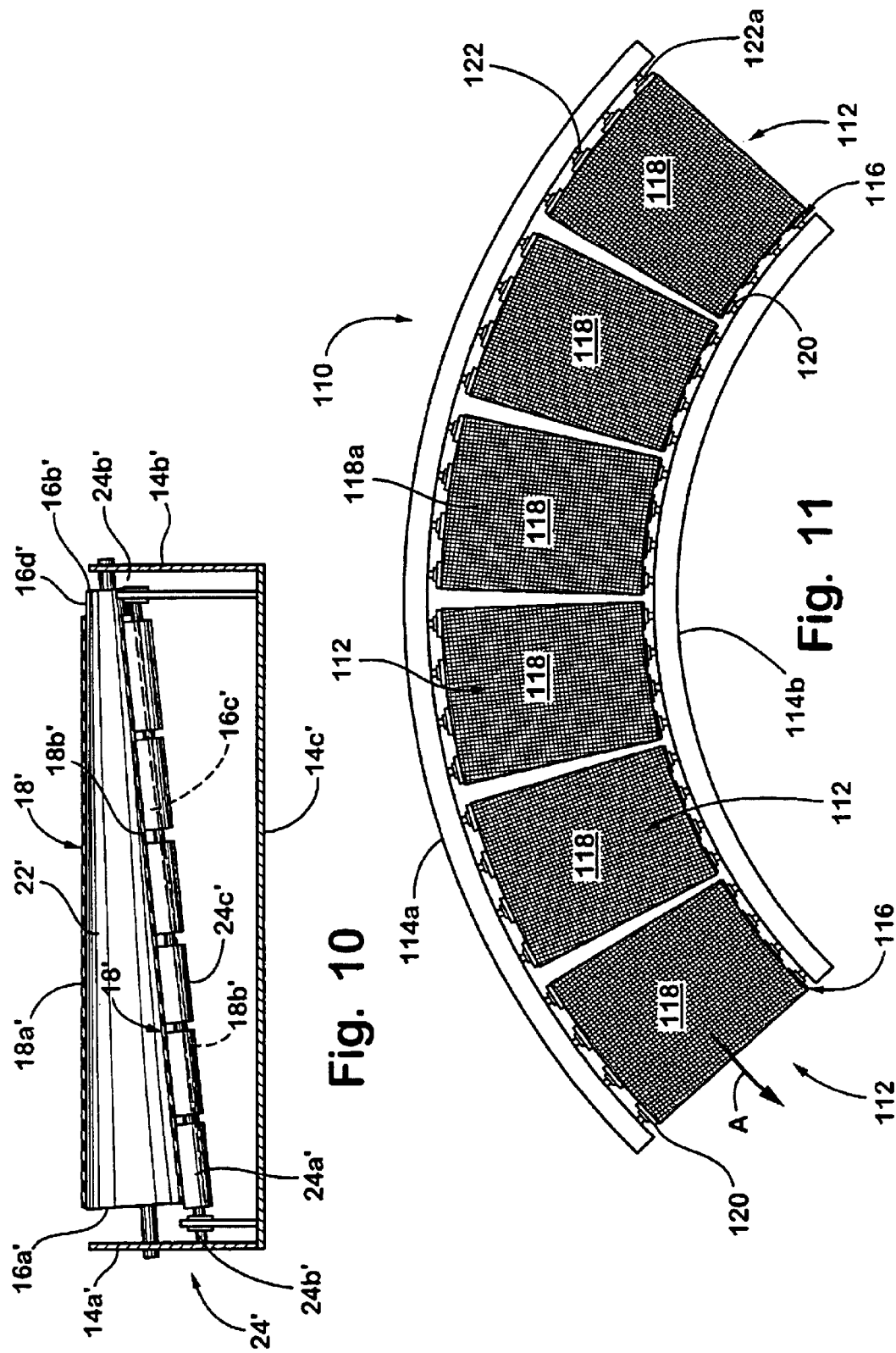

CURVED BELT CONVEYOR

CROSS REFERENCE TO RELATED APPLICATIONS

The present invention claims the benefit of U.S. provisional applications, Ser. No. 60/372,075, filed Apr. 12, 2002; Ser. No. 60/389,030, filed Jun. 14, 2002; and Ser. No. 60/420,847, filed Oct. 24, 2002, which are all hereby incorporated herein by reference in their entireties.

FIELD OF THE INVENTION

The present invention relates generally to conveyors and, more particularly, to a conveyor which conveys articles around a curve.

BACKGROUND OF THE INVENTION

It is known to provide zones of rollers in a curved roller conveyor, where each zone includes a motorized roller and a plurality of idler or freely rotating rollers. The motorized roller may be operable to drive the idler rollers via a plurality of O-rings connecting each roller to an adjacent roller or rollers in the zone. Each zone may be independently operable to accumulate articles on a particular zone or zones or to generally continuously convey articles along the zones of the roller conveyor. However, such roller conveyors are not suitable for applications where belt conveyors are desired, such as for conveying small articles which may fall between the rollers, or for applications where a belt conveyor may be required or desired for other reasons. Also, due to the low friction between the rollers and the articles being conveyed thereon, such roller conveyors are typically not suitable for providing accumulation of articles along an inclined or declined section of the roller conveyor. The low friction between the rollers and the articles also may limit the speed at which the articles may be conveyed around a curve, because the articles tend to slide outwardly as they move along the curve.

Curved belt conveyors have been proposed which provide a belt conveyor through a curved section. However, such curved conveyors require tracking or guiding devices to maintain or track the belt in the proper position around the belt rollers. The tracking devices or guiding devices are positioned along the curve and either radially inwardly of the belt or radially outwardly of the curved belt, and are attached directly to the belt, such as along the edge of the belt. The tracking devices function to guide and hold the belt in the desired position around the belt rollers. This typically requires that the side channels of the conveyor sidewalls have a greater width to accommodate the additional tracking, guiding and/or take up devices, which results in the conveyor having a greater width through the curved sections. Additionally, the belt or one of the belt rollers is driven by a motor typically positioned beneath the belt and belt rollers or along the curve and radially inward of the belt or radially outward of the belt. Such roller conveyors are not suitable for providing accumulation of articles along the curve.

SUMMARY OF THE INVENTION

The present invention provides a curved belt conveyor which is suitable for continuously conveying articles along curved zones or segments and/or accumulating articles on the individual curved zones or segments. The curved belt conveyor includes a plurality of curved segments or zones, each of which includes a continuous belt routed around a plurality of rollers and may be supported between a pair of spaced apart rollers by a slide plate or the like. Each of the curved zones may include a motorized roller and one or more idler rollers and may be independently operable to move articles along the curved belt conveyor or to accumulate articles on one or more of the curved zones of the curved belt conveyor.

According to an aspect of the present invention, a curved belt conveyor comprises at least one zone having a plurality of rollers and a continuous belt routed or reeved around at least two of the rollers. The rollers are positioned along and between curved opposite sidewalls of the conveyor. The belt is tracked with the rollers by surface contact with at least one of the rollers. Optionally, at least one of the rollers may comprise a motorized roller operable to drive the belt around the rollers.

According to another aspect of the present invention, a curved belt conveyor comprises at least two zones. Each of the zones has a plurality of rollers and a continuous belt routed or reeved around the rollers. The rollers are positioned along and between curved opposite sidewalls of the conveyor. The rollers of each of the zones comprise at least one motorized roller and at least one idler roller. The belts are tracked with the rollers. Each of the zones defines a curve of between approximately 10 degrees and approximately 30 degrees. Optionally, each of the zones may define a curve of approximately 15 degrees or approximately 22.5 degrees.

According to another aspect of the present invention, a curved belt conveyor includes at least one zone having at least two tapered rollers positioned along and between curved opposite sidewalls, a continuous belt routed or reeved around the tapered rollers, and a tracking roller positioned generally between a pair of the tapered rollers. The belt extends between the tapered rollers and contacts the tracking roller between the tapered rollers. The tracking roller engages the belt and is operable to track the belt with the tapered rollers while the belt moves around the tapered rollers of the zone.

The tracking roller may be adjustably mounted to the conveyor via an adjustment device at opposite ends of the tracking roller. The adjustment device may adjust the height of the respective end of the tracking roller via rotation of a threaded member which may be adjustable from a location generally above the curved belt conveyor.

According to another aspect of the present invention, a curved belt conveyor includes a plurality of rollers, a continuous belt routed around the rollers and tracking means for tracking the belt on the rollers. The belt defines a conveying region between curved opposite sidewalls. The tracking means is substantially contained laterally inward of opposite sides of the conveying region. Optionally, the plurality of rollers may comprise a motorized roller and at least one idler roller positioned along and between the opposite curved sidewalls.

The tracking means maintains or tracks the belt in its proper position or orientation around the rollers, such that the external tracking devices and wider conveyor portions of conventional curved belt conveyors are not required in connection with the curved belt conveyor of the present invention. Because the separate tracking devices are not required to maintain the belt in place on the rollers, the curved belt conveyor of the present invention may be designed within the confines of standard width conveyor sidewalls and conveyors.

In one form, the plurality of rollers may comprise a plurality of tapered rollers. The tracking means may comprise a tracking roller positioned generally along a lower surface of one of the tapered rollers and between the tapered rollers. The belt may be routed around the tapered rollers and in contact with an upper portion of the tracking roller. The tracking roller may be angled to be generally along an adjacent surface of the plurality of tapered rollers. The tracking roller may be adjustably mounted at the conveyor and may be adjustable to adjust the angle or orientation of the tracking roller relative to the tapered rollers.

According to yet another aspect of the present invention, a curved belt conveyor includes at least two curved zones, each of which is defined by a motorized roller and at least one idler roller positioned along and between curved opposite sidewalls of the conveyor, and a continuous belt routed around the motorized roller and the idler roller or rollers of each zone. The motorized roller is operable to drive the belt around the rollers to move articles along the respective curved zone. The belt may have a low modulus characteristic and may have at least approximately a 0.75% initial stretch in its lengthwise direction when the belt is reeved or positioned around the rollers. The low modulus characteristic of the belt may provide approximately a 2% to 4% or more stretch capability or characteristic to the belt.

The low modulus characteristic of the belt may allow the belt to remain in its proper position or orientation or to remain tracked around the rollers, such that the tracking devices and wider conveyor portions of conventional curved belt conveyors are not required in the curved belt conveyor of the present invention. Because the separate tracking devices are not required to maintain the low modulus belt in place on the rollers, the curved belt conveyor of the present invention may be designed within the confines of standard width conveyors.

Each curved zone may be independently operable to allow for accumulation of articles at one or more of the curved zones along the curved belt conveyor. Each curved zone may further include an article sensor which is operable to detect articles on the belt of the respective zone, whereby each curved zone may be operable in response to the article sensor and the particular application of the curved belt conveyor. Optionally, the curved belt conveyor may be implemented at an incline or a decline, and may be operable to accumulate articles on the incline or decline.

According to yet another aspect of the present invention, a curved belt conveyor includes at least two curved zones, each of which is defined by a motorized roller and at least one idler roller positioned along and between curved opposite sidewalls of the curved belt conveyor and a continuous belt routed around the motorized roller and the idler roller or rollers of each zone. The motorized roller is operable to drive the belt around the rollers to move articles along the respective curved zone. At least one of the rollers has a surface characteristic at the outer surface of the roller, while the belt has a surface characteristic at the interior surface of the belt. The surface characteristics of the roller surface and interior belt surface engage one another and function to track the belt on the roller at the interface of the belt and roller.

In one form, the surface characteristic of at least one of the rollers may comprise a tracking means for tracking or maintaining the belt in the desired location on the rollers. The tracking means may be positioned at the interface of the generally cylindrical or conical roller surface and the interior surface of the conveyor belt. The tracking means may comprise a generally flat belt positioned around the roller and in a location between the roller surface and the interior surface of the belt. In another form, the tracking means may be a raised portion or crown protruding outwardly from the roller surface and into engagement with the interior surface of the belt. The tracking means may be thin or flat enough such that the outer surface of the belt remains substantially flat over the roller. The belt may have a low modulus characteristic and may have at least approximately a 0.75% initial stretch in its lengthwise direction when the belt is reeved or positioned around the rollers. The low modulus characteristic of the belt may provide approximately a 2% to 4% or more stretch capability or characteristic to the belt.

Therefore, the present invention provides a curved belt conveyor which may accumulate articles along one or more zones of the curved belt conveyor. The zones may be individually operable to convey or accumulate articles therealong or thereon, such as via a motorized roller which drives the belt around the rollers of the respective zone. Two or more curved zones may be combined or aligned with, one another to achieve a desired overall curve of the curved belt conveyor. The curved belt conveyor may include a means or device for tracking a belt around at least two rollers of a curved segment or section of a conveyor. The tracking means may maintain or track the belt in its proper position or orientation around the rollers via surface contact between the belt and at least some of the rollers, such that the external tracking devices and wider conveyor portions of conventional curved belt conveyors are not required in connection with the curved belt conveyor of the present invention. Because the separate and external tracking devices are not required to maintain the belt in place on the rollers, the curved belt conveyor of the present invention may be designed within the confines of standard width conveyors and conveyor sidewalls.

These and other objects, advantages, purposes and features of the present invention will become apparent upon review of the following specification in conjunction with the drawings.

BRIEF DESCRIPTION OF THE DRAWINGS

FIG. 2 is an upper plan view of the curved belt conveyor of FIG. 1;

FIG. 3 is an end elevation of the curved belt conveyor of FIG. 2;

FIG. 5 is a sectional view of the curved belt conveyor taken along the line V—V in FIG. 2;

FIG. 6 is a sectional view of the curved belt conveyor taken along the line VI—VI in FIG. 2;

FIG. 6A is a sectional view similar to FIG. 6, showing a curved belt conveyor with a slider plate between the end rollers;

FIG. 8 is an upper plan view of the curved belt conveyor of FIG. 7;

FIG. 9 is an end elevation of the curved belt conveyor of FIGS. 7 and 8;

FIG. 10 is a partial sectional view taken along the line X—X in FIG. 8;

FIG. 11 is an upper plan view of another curved belt conveyor in accordance with the present invention, with the belts being reeved around generally cylindrical rollers;

DESCRIPTION OF THE PREFERRED EMBODIMENTS

Figure 1:
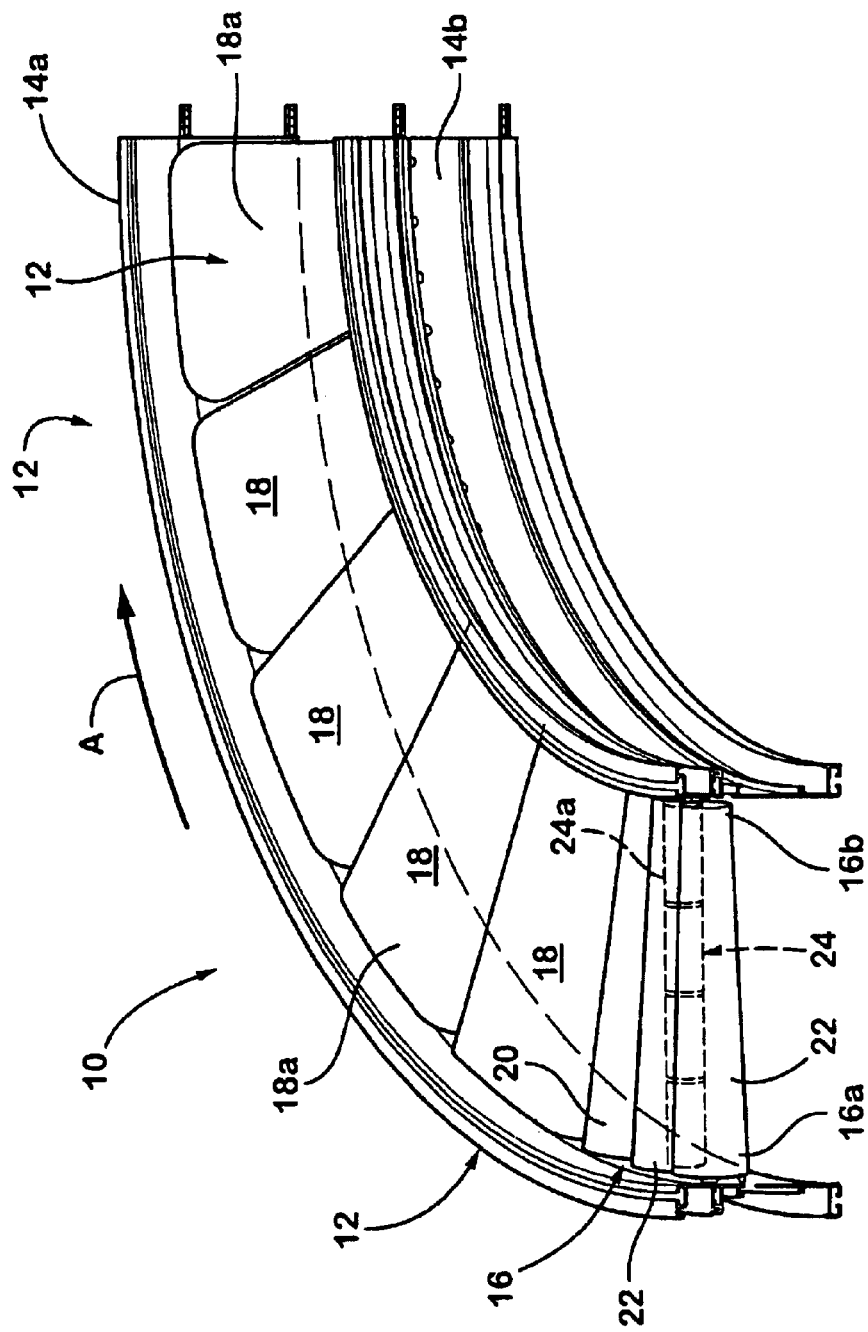
FIG. 1 is an upper perspective view of a curved belt conveyor in accordance with the present invention, with the belt removed from an upstream zone to show additional details of the rollers and belt tracking device.

Referring now specifically to the drawings and the illustrative embodiments depicted therein, a curved belt conveyor 10 includes a plurality of curved portions, sections, zones or segments 12 positioned along and between an outer curved sidewall or side frame 14a and an inner curved sidewall or side frame 14b, and is operable to convey articles in a direction of conveyance A (FIGS. 1 and 2). Each curved segment or zone 12 includes at least two rollers 16 and a continuous belt 18 routed or reeved around the rollers 16. The rollers 16 are angularly oriented and positioned along each zone and may include a driven or motorized roller 20, such as at a downstream or discharge end of each zone, and at least one idler roller 22, such as at an upstream end of each segment or zone. Curved belt conveyor 10 includes a means for tracking the belt or a tracking device 24 which is operable to track belt 18 around rollers 16. Tracking device 24 is substantially contained within or between sidewalls 14a, 14b of curved belt conveyor 10 and laterally inward of the opposite ends of the rollers 16, such that little or no tracking components or tracking devices are positioned outward of the inner or outer ends of the rollers or outward of a conveying region defined by an upper run 18a of belt 18. The sidewalls or frames 14a, 14b of conveyor 10 thus do not have to extend outwardly from the ends of the rollers 16 to accommodate conventional tracking devices or systems.

Each belted segment or zone 12 of curved belt conveyor 10 may be independently operable to accumulate articles on the curved segment or to move articles in the direction A onto a next, adjacent curved segment or to a discharge area or onto another conveyor, such as another belt conveyor, or a roller conveyor, slider bed, or the like, or any other means for receiving articles from a discharge end of the last zone or segment of the curved belt conveyor 10. Curved belt conveyor 10 may, for example, convey articles onto an adjacent straight belted conveyor, such as the type disclosed in U.S. patent application, Ser. No. 10/358,690, filed Feb. 5, 2003 by Cotter et al. for BELT CONVEYOR, now U.S. Pat. No. 6,811,018, which is hereby incorporated herein by reference, or onto another curved belted conveyor, such as of the types discussed herein, or any other known or conventional straight or curved conveyor or conveying surface or the like.

In the illustrated embodiment, each zone 12 includes a tapered motorized roller 20 and one or more tapered idler rollers 22 (such as the pair of tapered idler rollers in the illustrated embodiment of FIGS. 1–6), each of which has an outer end 16a which is wider or of a greater diameter than an inner end 16b. Motorized roller 20 may be the lead roller of the zone, and may thus be positioned at a downstream end of each curved segment 12, and thus may be operable to pull the belt 18 (and the articles supported thereon) along the respective segment 12.

Motorized roller 20 may comprise a self driven roller with an internal motor which is operable to rotate a roller portion relative to a shaft portion of the roller, such as a motorized roller of the types commercially available from various sources. For example, motorized roller 20 may comprise a DC motorized roller, such as a 12 volt DC motorized roller or the like, such as a roller of the type disclosed in U.S. Pat. No. 6,244,427, the disclosure of which is hereby incorporated herein by reference. Optionally, the motorized roller may comprise a 24 volt DC motorized roller or a 42 volt DC motorized roller or a 48 volt DC motorized roller or the like. It is further envisioned that the motorized roller may comprise other DC powered motorized rollers, or may comprise an AC powered motorized roller, such as described in U.S. Pat. No. 5,442,248, the disclosure of which is hereby incorporated herein by reference, without affecting the scope of the present invention. The motor of the motorized roller may drive the roller directly, such as disclosed in U.S. Pat. No. 6,244,427, or may drive the roller via a gear train or the like, such as disclosed in U.S. Pat. No. 5,442,248, the disclosures of which are hereby incorporated herein by reference. Because the rollers 16 of curved belt conveyor 10 may include such a motorized roller 20, curved belt conveyor 10 also may not include an external drive motor positioned beneath the belt and rollers or positioned along the curve and radially inwardly or outwardly of the conveyor sidewalls.

Motorized roller 20 thus is operable to drive belt 18, which moves along the idler rollers 22, which may generally freely rotate about their shaft portions to guide and support the belt 18 around the zone or segment 12. The idler rollers 22 may be any type of rollers, such as conventional, freely rotating rollers, such as the types also commercially available from various sources. Although shown in FIGS. 1–6 as having multiple idler rollers along each of the zones 12, one or more zones of the curved belt conveyor of the present invention may include a support plate or slider bed or support roller or rollers between the motorized roller 20 and an opposite end idler roller 22 to support the belt 18 between the ends of the zone 12, without affecting the scope of the present invention. For example, as shown in FIG. 6A, a curved slide plate 23 may be positioned between the tapered motorized roller 20 and tapered idler roller 22 to support the upper run 18a of belt 18 between the pair of rollers or end rollers of the zone. The rollers 16 may be able to accommodate a belt which has a sufficient width to cover substantially the entire width of the conveyor between the sidewalls of the conveyor, as shown in FIGS. 1, 2, 4 and 5, because the ends of the rollers for the curved belt conveyor of the present invention do not require O-ring guides and the like.

Figure 4:
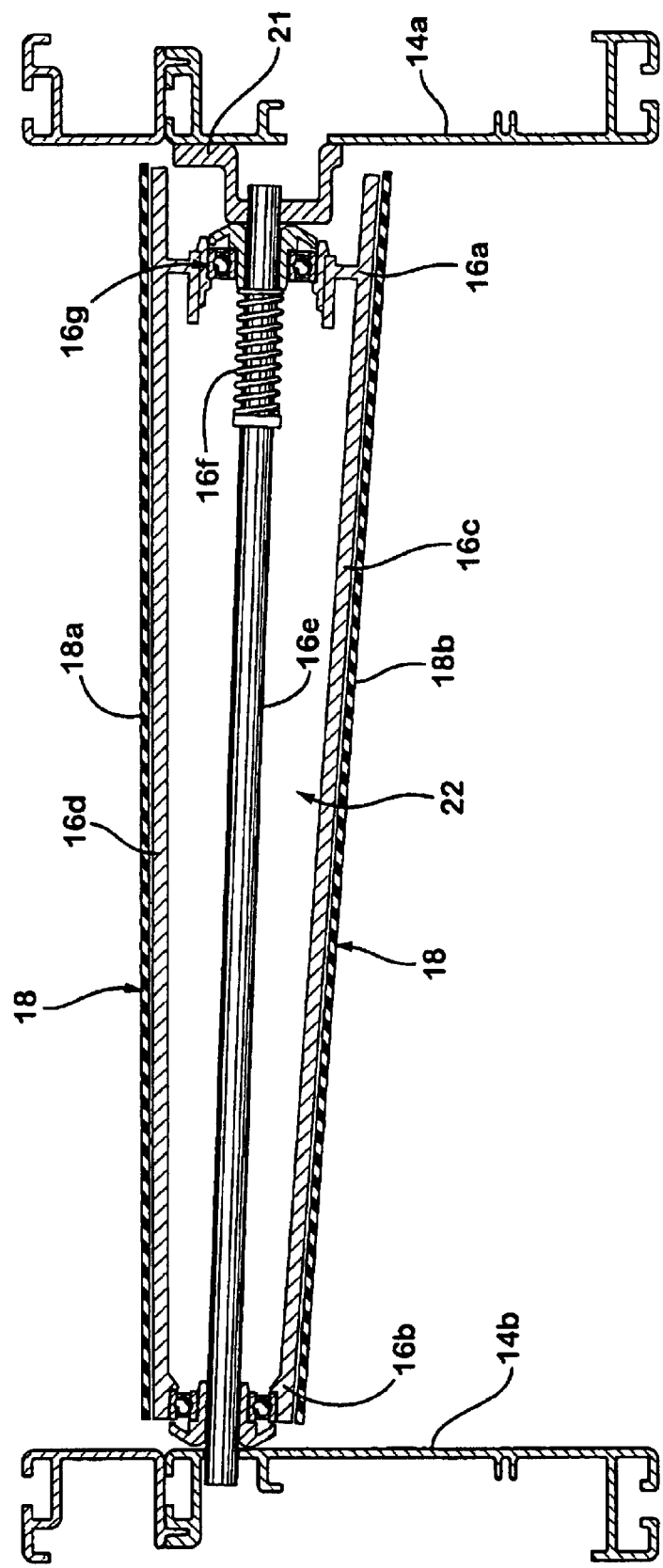
FIG. 4 is a sectional view of the curved belt conveyor taken along the line IV—IV in FIG. 2.

As can be seen in FIG. 4, the rollers 16 may be mounted to the outer sidewall 14a of curved belt conveyor 10 via an inwardly positioned mounting bracket or support 21 mounted to or affixed to the inner surface of outer sidewall 14a (although an idler roller 22 is shown in FIG. 4, the motorized rollers may be mounted to conveyor 10 in a similar manner). Mounting bracket 21 may provide a mounting aperture for receiving an end of a shaft portion 16e of rollers 16 to non-rotatably support the outer end of shaft portion 16e of rollers 16. As shown in FIG. 4, shaft portion 16e of idler rollers 22 may be spring loaded or biased via a biasing member or spring 16f to allow shaft portion 16e to be moved inward at one end of the roller (such as at end 16a of roller 16) to facilitate alignment of the roller with the mounting bracket 21, whereby the shaft portion 16e may be released to extend into the corresponding opening in the mounting bracket 21 in response to biasing member 16f. The opposite end of shaft portion 16e (such as at end 16b of roller 16) may insert into a corresponding aperture in inner sidewall 14b.

Mounting bracket 21 thus provides a shaft support for the end of the roller shaft such that the end of the shaft is positioned at the inner side of outer sidewall 14a and does not extend through outer sidewall 14a, as the opposite end of the shaft 16e does through inner sidewall 14b, and as may typically occur with conventional rollers and sidewalls. Because the roller shafts do not extend through the sidewall 14a of conveyor 10, the shafts do not interfere with the area outside of sidewall 14a. The mounting bracket 21 thus may facilitate positioning a control box or other equipment or component (not shown in FIG. 4) at the outer area of outer sidewall 14a and generally or substantially within the C-channel defined by outer sidewall 14a. As can be seen in FIG. 4, the roller portion of roller 16 may extend outwardly beyond the bearing assembly 16g of the roller 16 to extend substantially toward outer sidewall 14a and around bracket 21 to provide a conveying region which may substantially span the area between sidewalls 14a, 14b.

In the illustrated embodiment of FIGS. 1–6, tracking device 24 comprises a tracking roller 24a, which may be positioned partially above a plane defined by the lower surface 16c of tapered rollers 16, as best shown in FIG. 5. Tracking roller 24a may comprise a segmented, generally cylindrical or non-tapered roller, and, as shown in the illustrated embodiment of FIGS. 1, 3 and 5, may include three sections or rollers 24c (but may include more or less sections without affecting the scope of the present invention) rotatably mounted or positioned along a shaft or axle portion 24b. The different roller sections 24c may be generally freely rotatable about axle portion 24b and may rollingly engage a lower run 18b (FIGS. 4 and 5) of the belt 18 when belt 18 is driven by motorized roller 20. The tracking roller 24a may include multiple sections to accommodate the different speed of the belt over the tracking roller due to the curve of the belt along the curved conveyor section or zone 12. As shown in FIGS. 1 and 6, tracking roller 24a may be positioned generally adjacent to or generally along the upstream idler roller 22 and may be positioned between a pair of idler rollers 22 at or near an opposite end of the zone from the motorized roller 20.

Tracking roller 24a may be mounted at or within or between sidewalls 14a, 14b with its shaft or axis 24b angled so as to generally correspond or align with an adjacent surface of the tapered rollers. For example, the tracking roller 24a may be angled vertically and horizontally to be generally parallel to the closest surface of the tapered roller or may be at a different angle with respect to lower surface 16c of the tapered rollers, as desired or required to maintain proper tracking of belt 18 around rollers 16. Belt 18 may be routed around the rollers 16 such that the upper run 18a of belt 18 is routed over and along the upper surface 16d of the rollers and the lower run 18b of belt 18 is routed under the end rollers and over the tracking roller 24a, as can be seen with reference to FIG. 5. Belt 18 may comprise a conventional belt or may comprise a stretchable belt having a low modulus or stretch characteristic, such as discussed below with respect to belt 118.

Tracking roller 24a functions to press or guide belt 18 upwardly between the rollers 16 to maintain belt 18 in position or tracked on rollers 16 while the belt is moved around the rollers 16 via driving rotation of motorized roller 20. Tracking roller 24a may be adjustably mounted to the sidewalls or to another frame portion of the conveyor, and may be vertically and/or horizontally adjusted as required or desired to maintain proper tracking of the belt 18 around rollers 16, as discussed below. Tracking roller 24a may have a small diameter relative to the diameter of the tapered rollers 16 and may be positionable slightly below the tapered rollers 16.

As can also be seen in FIG. 5, the elevation of each end of the axle portion 24b may be adjustable relative to the conveyor sidewalls 14a, 14b, such as via an adjustment device 25. In the illustrated embodiment, each adjustment device 25 may include a threaded fastener or screw or bolt 25a, which is received at least partially within a mounting block 25b mounted to the respective sidewall 14a, 14b, and at least partially within a threaded movable shaft support 25c, which receives the axle portion 24b of roller 24a. Rotation of threaded screw 25a, such as via a screwdriver or the like (not shown) engaging a slotted head portion 25d of threaded screw 25a, may thus cause generally vertical translational movement of the respective shaft support 25c relative to mounting block 25b to vertically adjust the position of the end of the axle portion 24b relative to the sidewall 14a, 14b. The curved belt conveyor of the present invention thus may provide access to the adjustment devices 25 from a location generally above the conveyor section, such that the rollers 16 or conveyor sidewalls 14a, 14b may not have to be disassembled or moved to access and adjust the orientation of the tracking roller 24a. The tracking device 24 may thus be adjusted to adjust the tracking or engagement of the roller 24a with the belt 18 to maintain proper tracking of the belt 18 around rollers 16.

Tracking device 24 thus may be adjustable relative to the rollers 16 of the respective zone 12 to properly track belt 18 around the rollers 16. Tracking roller 24a, when properly positioned along rollers 16, may function to draw or track the belt radially outward along the curve and toward the outer ends 16a of rollers 16 in response to driving of the motorized roller in a forward direction (which drives the belt to convey articles in the direction of conveyance A) until the belt is properly positioned around the rollers. When properly positioned, the belt may be substantially taught or tight around the inner ends 16b of rollers 16 to limit further outward movement of the belt along the rollers during operation of the motorized roller in the forward direction. It is further envisioned that when the driving direction of the motorized roller is reversed, the roller and tracking roller arrangement of the present invention may function to move the belt radially inward along the rollers toward their inner ends 16b to loosen the belt around the rollers, thereby easing the disassembly process of the conveyor or maintenance of the conveyor.

Each curved zone 12 may provide approximately a 15 degree angle or curve. This angle may be selected because multiples of this angle may provide standard or desired curves, such as 15, 30, 45, 60 and/or 90 degree curves, which are often desired or required in conveyor layouts.

Optionally, each curved zone 12 may provide any other curve or angle, such as a 10 degree curve, a 22.5 degree curve, a 30 degree curve or the like, without affecting the scope of the present invention. By limiting the size of the angle of the curved zone, the belt 18 may also be limited to a relatively small size, which helps to maintain the belt in its proper position around the rollers, and may reduce the load on the motorized or powered roller 20.

Each curved zone or segment 12 may also include a photo-eye or article sensor or photosensor (such as photo-eyes 26 shown in FIG. 2) for detecting and/or monitoring articles or packages or the like on belt 18 of the respective zone. Curved belt conveyor 10 may further include a control 27 (FIG. 2) for independently operating the motorized roller 20 of the respective zone to move the articles along the segment 12 and/or to temporarily stop the movement of an article or articles, in order to accumulate articles on the segment 12, in response to the photo-eye or sensor 26 and depending on the particular application of curved belt conveyor 10. The control and photo-eyes may be operable to accumulate articles on the curved belt conveyor, and may be operable to individually or independently control operation of at least some of the zones, such as by utilizing the principles disclosed in U.S. provisional application, Ser. No. 60/412,396, filed Sep. 20, 2002 by Haan et al. for CONVEYOR SYSTEM REVERSE-SLUG ACCUMULATION; and/or in U.S. patent application, Ser. No. 10/358,690, filed Feb. 5, 2003 by Cotter et al. for BELT CONVEYOR, now U.S. Pat. No. 6,811,018 which are hereby incorporated herein by reference.

The curved belt conveyor of the present invention may provide an increased coefficient of friction between the belted conveying surface and the products being conveyed therealong over the friction provided by rollers of conventional roller conveyors. The curved belt conveyor of the present invention thus may be operable at a greater speed than conventional roller conveyors, without causing the products to slide radially outwardly around the curved zone or segment. The curved belt conveyor of the present invention may also provide enhanced capability to move and accumulate articles along each zone individually.

Curved belt conveyor 10 thus may be operable to accumulate articles on one or more of the curved segments or zones of the conveyor. Optionally, the curved belt conveyor 10 may be operable on an incline or decline and may accumulate articles on the incline or decline. It is further envisioned that the curved belt conveyor 10 may be operable to move articles, such as upward along an incline, as the articles are required by a downstream device or system. It is envisioned that the curved sections or zones 12 of the conveyor may combine to form a generally spiral-shaped incline or decline.

Therefore, the curved belt conveyor of the present invention is operable to track or maintain the belt in its proper position on the rollers as the belt is driven around the rollers via the motorized roller. The tracking means or tracking roller may be contained substantially entirely between the sidewalls of the conveyor and laterally inwardly of the opposite ends of the tapered rollers and of the conveying region defined by the upper run of the belt, such that no additional tracking devices or components are necessary along the outer or inner sidewalls (and extending outwardly or inwardly therefrom) of the conveyor to maintain the belt in position around the rollers.

Referring now to FIGS. 7–10, a curved belt conveyor 10' includes a plurality of curved portions, zones or segments 12' positioned along and between an outer curved sidewall or side frame 14a' and an inner curved sidewall or side frame 14b', and is operable to convey articles in a direction of conveyance A. Each curved segment or zone 12' includes a tapered driven or motorized roller 20' and at least one tapered idler roller 22' angularly oriented and positioned at opposite ends of each segment or zone, and a continuous belt 18' routed or reeved around the rollers 20', 22', similar to curved belt conveyor 10, discussed above. Curved belt conveyor 10' may also include a middle support roller 17' positioned between motorized roller 20' and idler roller 22', and a tracking means or tracking device 24' which is operable to track the belt 18' around rollers 20', 22'. Motorized roller 20' and idler roller 22' may be substantially similar to motorized roller 20 and idler rollers 22, discussed above, such that a detailed discussion of the rollers and their mounting arrangement will not be repeated herein.

Each belted segment or zone 12' of curved belt conveyor 10' may be independently operable to accumulate articles on the curved segment or zone or to move articles in the direction A onto a next, adjacent curved segment or zone or to a discharge area or onto another conveyor, such as another belt conveyor, or a roller conveyor, slider bed, or the like, or any other means for receiving articles from a discharge end of the last zone or segment of the curved belt conveyor 10'. In the illustrated embodiment, motorized roller 20' is the lead roller of the zone, and is thus positioned at a downstream end of each curved segment 12', and is operable to pull the upper run 18a' of belt 18' (and the articles supported thereon) along the respective segment 12'.

As shown in FIGS. 7–10, the rollers 20', 22' may accommodate a belt which has a sufficient width to cover substantially the entire width of the conveyor between the sidewalls of the conveyor, because the ends of the rollers for the curved belt conveyor of the present invention do not require O-ring guides and the like. Optionally, curved belt conveyor 10' may include a curved slider bed (not shown) and/or support roller 17' (FIGS. 7 and 8) between the motorized roller 20' and the opposite end idler roller 22' to support the belt 18' between the rollers of each zone 12'.

Figure 7:
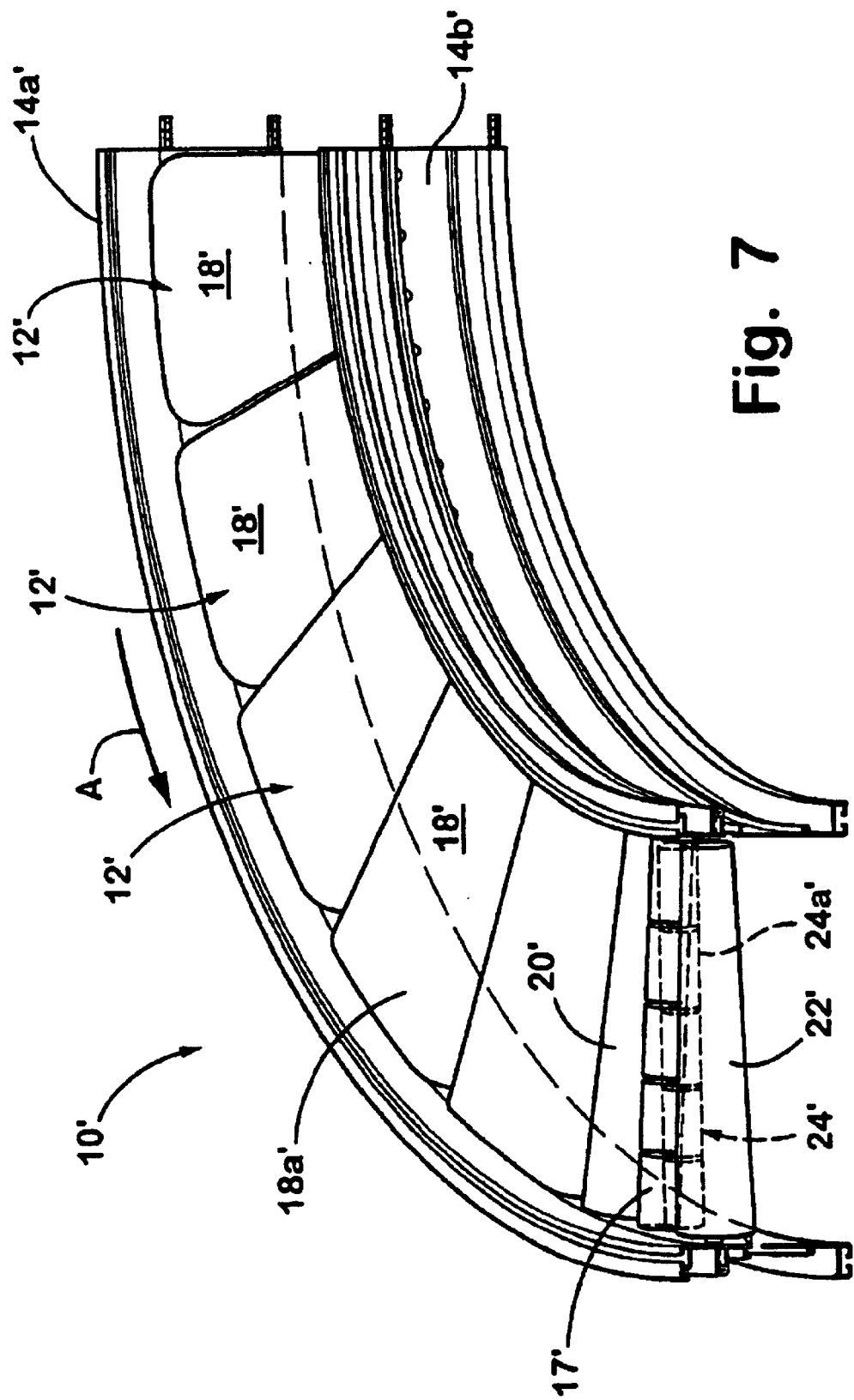
FIG. 7 is an upper perspective view of another curved belt conveyor in accordance with the present invention, with the belt removed from a downstream zone to show additional details of the rollers and belt tracking device.

For example, curved belt conveyor 10' may further include support roller 17' positioned between motorized roller 20' and idler roller 22' and along the upper surfaces 16d' of the rollers. As shown in FIGS. 7 and 8, support roller 17' may comprise a segmented, non-tapered roller mounted between the sidewalls 14a', 14b' and having a plurality of roller segments or sections 17a', which may be freely rotatable about a shaft portion 17b' as belt 18' is moved over the upper or support surface of support roller 17'. Support roller 17' may include multiple sections or segments to accommodate different speeds of the belt over the support roller due to the curve of the belt along the curved conveyor section or zone. Support roller segments 17a' may have a small diameter relative to the tapered rollers, such that support roller 17' may be positioned along the upper portion of the rollers and below upper run 18a' of belt 18'. Support roller 17' thus may provide support of belt 18' between rollers 20', 22', but may not extend downward and interfere with tracking roller 24a' and belt 18'.

Similar to tracking device 24 discussed above, tracking device 24' may be substantially contained within or between sidewalls 14a', 14b' of the conveyor 10' and laterally inward of the opposite ends of the rollers, such that little or no tracking components or tracking devices are positioned outward of the inner or outer ends of the rollers. The sidewalls or frames 14a', 14b' of conveyor 10' thus do not have to extend outwardly from the ends of the rollers to accommodate conventional tracking devices or systems.

In the illustrated embodiment of FIGS. 7–10, tracking device 24' comprises a tracking roller 24a', which is positioned at least partially above a plane defined by the lower surface 16c' of the tapered rollers 20', 22', as is best shown in FIGS. 9 and 10. Tracking roller 24a' is substantially similar to tracking roller 24a, discussed above, and comprises a segmented, non-tapered roller having multiple segments or rollers 24c' (five or six such segments are shown in FIGS. 7–10, but roller 24a' may have more or less sections without affecting the scope of the present invention) with its shaft or axis 24b' angled so as to generally correspond or align with an adjacent surface of the tapered rollers. For example, the tracking roller 24a' may be angled vertically and horizontally to be generally parallel to the closest surface of the roller, or may be skewed relative to the surface of the tapered rollers, depending on the orientation selected or desired to effectively track the belt 18' around the rollers, similar to tracking roller 24a, discussed above. Optionally, tracking roller 24a' may be adjustably mounted to a frame portion, such as to sidewalls 14a', 14b' of conveyor 10' or to a base frame portion 14c' of conveyor 10', such as via an adjustment device similar to adjustment device 25 discussed above, or via another adjustment means or device, and may be vertically and/or horizontally adjusted as required or desired to maintain proper tracking of the belt 18' around rollers 20', 22'. Tracking roller 24a' may have a small diameter relative to the diameter of the tapered rollers and may be positionable slightly below the tapered rollers between the frame portion or base 14c' and the rollers.

Belt 18' may be routed around the rollers 20', 22', such that upper run 18a' of the belt is routed over and along the upper surface 16d' of the rollers and a lower run 18b' of the belt is routed under the rollers and over the tracking roller 24a', as can be seen with reference to FIG. 10. Tracking roller 24a' functions to press or guide lower run 18b' of belt 18' upwardly between the rollers to maintain belt 18' in position or tracked on rollers 20', 22' while the belt is moved around the rollers via driving rotation of motorized roller 20'. Tracking roller 24a', when properly positioned along rollers, may function to draw or track the belt radially outward along the curve and toward the outer ends 16a' of the rollers in response to driving of the motorized roller in a forward direction (which drives the belt to convey articles in the direction of conveyance A) until the belt is properly positioned around the rollers. When properly positioned, the belt may be substantially taught or tight around the inner ends 16b' of the rollers to limit further outward movement of the belt along the rollers during operation of the motorized roller in the forward direction. It is further envisioned that when the driving direction of the motorized roller is reversed, the roller and tracking roller arrangement of the present invention may function to move the belt radially inward along the rollers toward their inner ends 16b' to loosen the belt around the rollers, thereby easing the disassembly process of the conveyor or maintenance of the conveyor.

Similar to zones 12, discussed above, each of the curved zones 12' may provide approximately a 15 degree angle or curve or may provide any other curve or angle, such as a 10 degree curve, a 22.5 degree curve, a 30 degree curve or the like, without affecting the scope of the present invention. By limiting the size of the angle of the zone, the belt 18' may also be limited to a relatively small size, which may help to maintain the belt in its proper position around the rollers, and may reduce the load on the motorized roller 20'. Also, as discussed above with respect to curved belt conveyor 10, each curved zone or segment 12' of curved belt conveyor 10' may include a photo-eye or sensor (such as photo-eyes 26' shown in FIG. 8) for detecting and/or monitoring articles or packages or the like on belt 18' of the respective zone. Conveyor 10' may further include a control 27' for independently operating the motorized roller 20' of the respective zone to move the articles along the segment 12' and/or to temporarily stop the movement of an article or articles, in order to accumulate articles on the segment 12', such as in the manner discussed above.

Referring now to FIG. 11, a curved belt conveyor 110 includes a plurality of curved portions, zones or segments 112 positioned along and between an outer curved sidewall or side frame 114a and an inner curved sidewall or side frame 114b, and is operable to convey articles in a direction of conveyance A. Each curved segment or zone 112 includes a plurality of rollers 116 and a continuous belt 118 routed or reeved around the rollers 116. Each belted zone 112 may be independently operable to accumulate articles on the curved zone or to move articles in the direction A onto a next, adjacent curved segment or section or zone or to a discharge area or onto another conveyor, such as another belt conveyor, or a roller conveyor, slider bed, or the like, or any other means for receiving articles from a discharge end of the last zone or segment of the curved belt conveyor 110. The curved belt conveyor 110 may, for example, convey articles onto an adjacent straight belted conveyor, such as the type disclosed in U.S. patent application, Ser. No. 10/358, 690, filed Feb. 5, 2003 by Cotter et al. for BELT CONVEYOR, now U.S. Pat. No. 6,811,018, which is hereby incorporated herein by reference, or onto another curved belted conveyor, such as of the types discussed herein, or onto any other known or conventional conveyor or conveying surface or the like.

Similar to conveyor 10, rollers 116 of each curved segment or zone 112 of conveyor 110 may include a motorized roller 120 and at least one non-motorized or idler roller 122. In the illustrated embodiment, motorized roller 120 is the lead roller of the zone, or is positioned at a downstream end of each curved segment 112, to pull the upper run 118a of belt 118 (and the articles supported thereon) along the respective segment 112. Motorized roller 120 may be a self driven roller with a motor within the roller which is operable to rotate a roller portion relative to a shaft portion of the roller, such as a motorized roller of the types commercially available from various sources, such as a DC or AC powered motorized roller or the like, such as the types discussed above. The motorized roller 120 thus may drive the belt 118 which may move along the idler rollers 122, which may freely rotate about their shaft portions to guide and support the belt 118 around the zone or segment 112. The idler rollers 122 may be conventional, freely rotating rollers, such as the types also commercially available from various sources.

Figure 12:
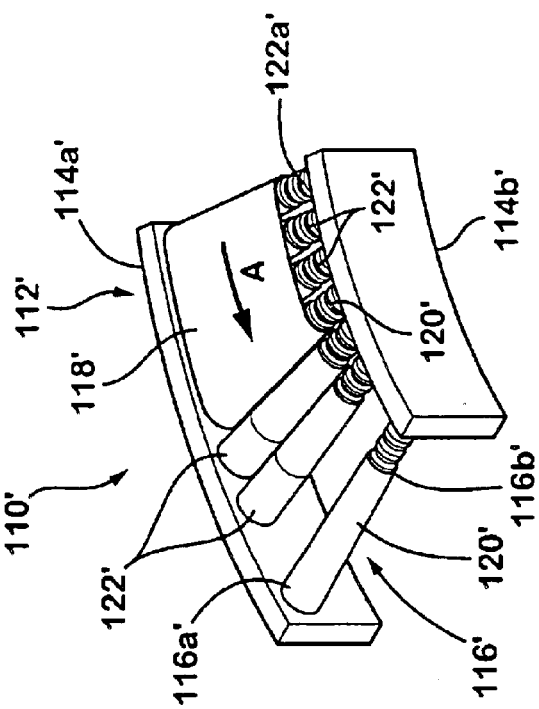
FIG. 12 is an upper perspective view of two zones of another curved belt conveyor in accordance with the present invention, with the belt removed from a downstream zone.
Figure 13:
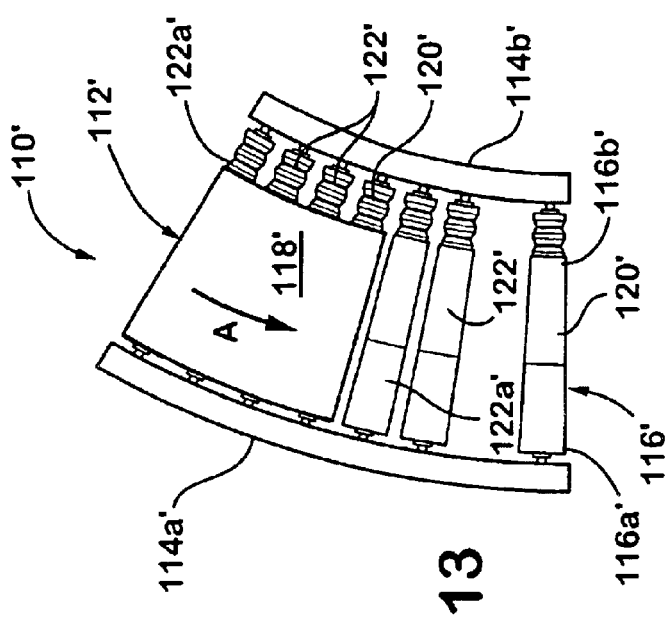
FIG. 13 is an upper plan view of the curved belt conveyor of FIG. 12.
Figure 14:
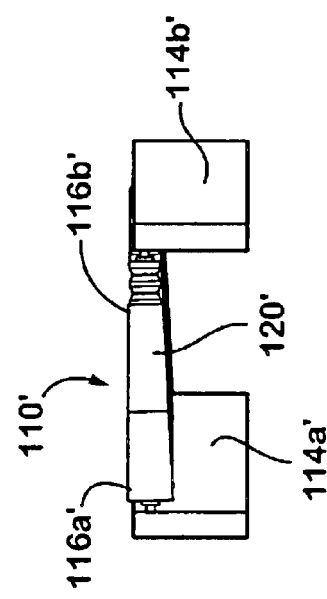
FIG. 14 is an end elevation of the curved belt conveyor of FIGS. 12 and 13.

In the illustrated embodiment of FIG. 11, rollers 116 are generally cylindrical, non-tapered rollers. However, as shown in FIGS. 12–14, a curved belt conveyor 110' may include tapered rollers 116', such as tapered motorized rollers 120' and tapered idler rollers 122' mounted to curved sidewalls 114a', 114b'. The tapered rollers 116' may have an outer end 116a' which is wider or of a greater diameter than an inner end 116b'. Although shown as conventional tapered rollers for O-ring type driven roller conveyors in FIGS. 12–14, the rollers 116' of curved belt conveyor 110' may comprise any other type of straight or tapered rollers, such as tapered rollers of the types shown in FIGS. 1–10, without affecting the scope of the present invention. Curved belt conveyor 110' may otherwise be substantially similar to curved belt conveyor 110, such that a detailed discussion of curved belt conveyor 110' will not be repeated herein.

The rollers of the curved belt conveyor 110, 110' may be able to accommodate a belt which has a sufficient width to span or cover substantially the entire width between the sidewalls of the conveyor, as shown in FIG. 1, because the ends of the rollers for the curved belt conveyor of the present invention do not require the O-ring guides shown in FIGS. 12–14. Although shown as having multiple idler rollers along each of the zones 112, a zone of the curved belt conveyor of the present invention may alternately include a curved slider bed or other type of support roller (not shown) between the motorized roller 120, 120' and an opposite end idler roller 122a, 122a' to support the belt 118 between the ends of the zone 112, 112', without affecting the scope of the present invention.

Belt 118, 118' of conveyor 110, 110' may comprise a stretchable belt which has a low modulus characteristic and may provide at least approximately a 0.75% initial stretch in its lengthwise direction when the belt is reeved or positioned around the rollers. The low modulus characteristic of the belt may provide approximately a 2% to 4% or more stretch capability or characteristic to the belt. This may provide a substantially greater amount of stretch over conventional conveyor belts, which may typically only provide approximately a 1% stretch capability or characteristic, and which are typically reeved around the rollers with only about a 0.25% initial stretch. The low modulus belt 118, 118' may be made from urethane extrusions or urethane with polyester or nylon tension members encapsulated, and may be similar to the type of belts commercially available from Nitta Corporation for use in graphic arts and letter mail sorting.

The low modulus characteristic of belt 118, 118' may cause the belt to remain generally in its appropriate position about the rollers 116, 116' without additional tracking components or devices being required laterally outwardly of the rollers and/or sidewalls. Therefore, the curved belt conveyor of the present invention may be implemented within standard width conveyor sidewalls. The low modulus characteristic or elasticity of belt 118, 118' also may allow each curved zone 112, 112' of curved belt conveyor 110, 110' to be operated without any take-up or adjustment being necessary to maintain the appropriate tension in the belt. However, such adjustment may be provided on curved belt conveyor 110, 110', without affecting the scope of the present invention.

Each curved zone 112, 112' may provide approximately a 15 degree angle or curve, which may be selected because multiples of this angle provide standard or desired curves, such as 15, 30, 45, 60 and/or 90 degree curves, which are often desired or required in conveyor layouts. Optionally, each curved zone 112, 112' may provide any other curve or angle, such as approximately a 10 degree curve, a 22.5 degree curve, a 30 degree curve or any other angle or curve, without affecting the scope of the present invention. By limiting the size of the angle of the zone, the belt 118, 118' may also be limited to a relatively small size, which may help to maintain the belt in its proper position around the rollers, and which may reduce the load on the motorized or powered roller 120, 120'.

Each curved zone or segment 112, 112' may also include a photo eye or sensor (not shown in FIGS. 11–14) for detecting articles or packages or the like on belt 118, 118' of the respective zone. Curved belt conveyor 110, 110' may further include a control (also not shown) for independently operating the motorized roller 120, 120' of the respective zone to move the articles along the zone 112, 112' and/or to temporarily stop the movement of an article or articles, in order to accumulate articles on the zone 112, 112', in response to the sensor and depending on the particular application of curved belt conveyor 110, 110'.

The belt of the curved belt conveyor 110, 110' also may provide an increased coefficient of friction between the conveying surface and the products being conveyed therealong over the friction provided by rollers of conventional roller conveyors. This may allow the curved belt conveyor 110, 110' to operate at a greater speed than roller conveyors, without causing the products to slide radially outwardly around the curved zone or segment. This also may enhance the capability to move and accumulate articles along each zone individually.

Curved belt conveyor 110, 110' thus may be operable to accumulate articles on one or more of the curved segments or zones of the conveyor. Optionally, the curved belt conveyor 110, 110' may be operable on an incline or decline and may accumulate articles on the incline or decline. It is further envisioned that the curved belt conveyor 110, 110' may be operable to move articles, such as upward along an incline, as the articles are required by a downstream device or system. It is envisioned that the curved sections or zones 112, 112' may combine to form a generally spiral-shaped incline or decline.

Figure 15:
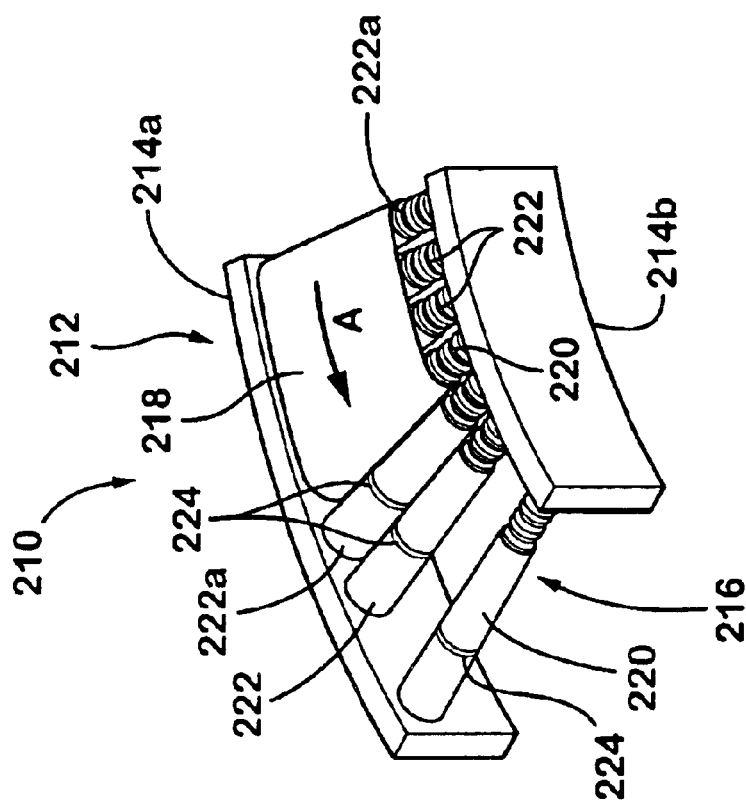
FIG. 15 is an upper perspective view of two zones of another curved belt conveyor in accordance with the present invention, with the belt removed from a downstream zone to show a tracking member positioned around the rollers.
Figure 16:
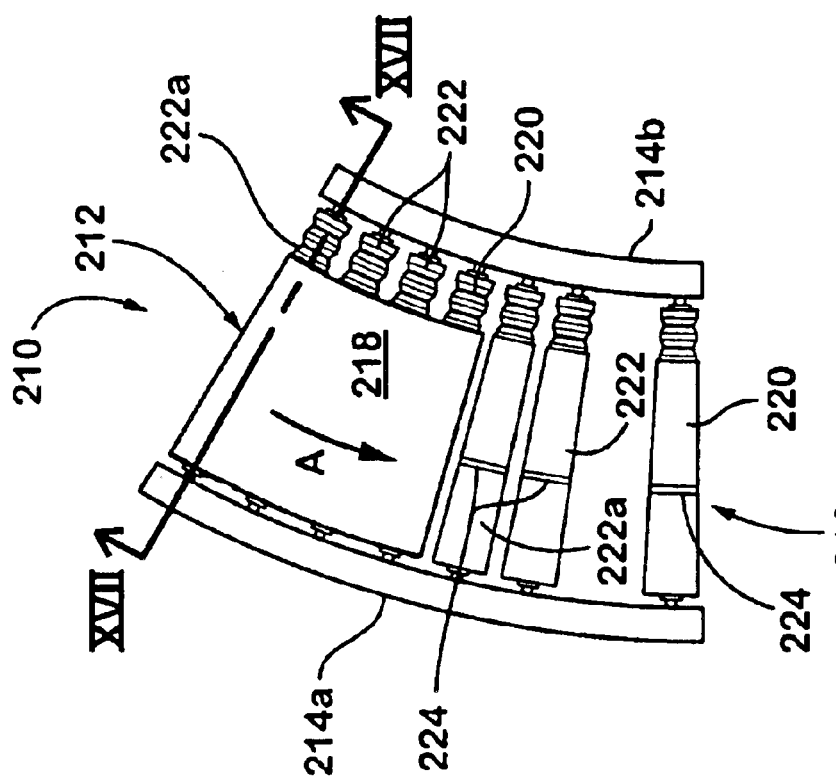
FIG. 16 is an upper plan view of the curved belt conveyor of FIG. 15.
Figure 17:
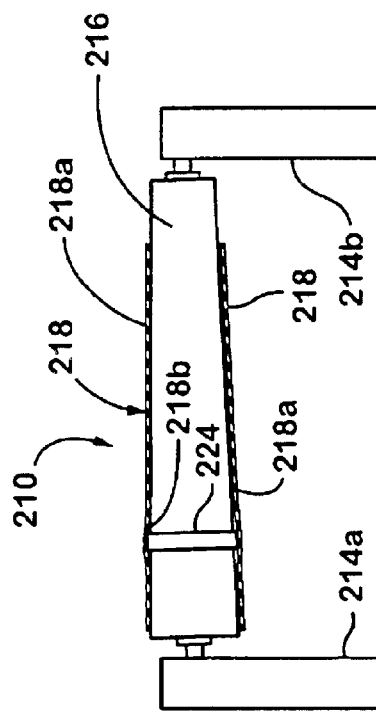
FIG. 17 is a partial sectional view of the curved belt conveyor taken along the line XVII—XVII of FIG. 16.

Referring now to FIGS. 15–17, a curved belt conveyor 210 includes a plurality of curved portions, zones or segments 212 positioned along and between an outer curved sidewall or side frame 214a and an inner curved sidewall or side frame 214b, and is operable to convey articles in a direction of conveyance A. Curved belt conveyor 210 may be substantially similar to curved belt conveyor 110, 110', discussed above, such that a detailed discussion will not be repeated herein. Suffice it to say that each curved segment or zone 212 includes a plurality of rollers 216 and a continuous belt 218 routed or reeved around the rollers 216. Each belted zone 212 may be independently operable to accumulate articles on the curved zone or to move articles in the direction A onto a next, adjacent curved segment or zone or to a discharge area or onto another conveyor, such as another belt conveyor, roller conveyor, slider bed, or the like, or any other means for receiving articles from a discharge end of the last zone or segment of the curved belt conveyor 210.

Rollers 216 of each curved segment or zone 212 may include a motorized roller 220 and at least one non-motorized or idler roller 222. The motorized roller 220 drives the belt 218 which moves along the idler rollers 222, which may generally freely rotate about their shaft portions to guide and support the belt 218 around the zone or segment 212. Although shown as having multiple idler rollers along each of the zones 212, a zone of the curved belt conveyor of the present invention may alternately include a curved slider bed or the like (not shown) between the motorized roller 220 and an opposite or upstream end idler roller 222a to support the belt 218 between the ends of the zone 212, without affecting the scope of the present invention. Rollers 216 may comprise tapered rollers (such as shown in FIGS. 15–17), having an outer end which is wider or of a greater diameter than an inner end, or may comprise generally cylindrical rollers (such as shown in FIG. 11), without affecting the scope of the present invention. Similar to belt 118, discussed above, belt 218 may have a low modulus characteristic and may have at least approximately a 0.75% initial stretch in its lengthwise direction when the belt is reeved or positioned around the rollers. The low modulus characteristic of the belt may provide approximately a 2% to 4% or more stretch capability or characteristic to the belt.

Curved belt conveyor 210 may include a tracking band or tracking member 224 or any other means for tracking the conveyor belt 218 on the rollers 216. Tracking member 224 may be operable to track or maintain the conveyor belt 218 at the desired and appropriate position about rollers 216. A tracking band or tracking member 224 may be positioned around at least one roller 216 of each zone or section 212, and optionally, a tracking member 224 may be positioned around each roller 216 of each zone or section 212. Tracking members or tracking means 224 may be positioned around rollers 216 such that the tracking means is positioned between or at the interface of the respective roller 216 and the conveyor belt 218, as best seen in FIG. 17. As shown in FIG. 17, tracking means 224 may be a belt or band or ring, such as a rubber or elastic belt or band or the like, which is wrapped around the roller and positioned between the roller and conveyor belt 218. The tracking member 224 may be generally flat and thin such that the outer surface 218a of the conveying belt 218 remains substantially flat over the surface of the rollers. The tracking means 224 thus engages an interior surface 218b of belt 218 (the surface facing and engaging the roller surface) and generally maintains that position or orientation of belt 218 relative to roller 216.

Figure 18:
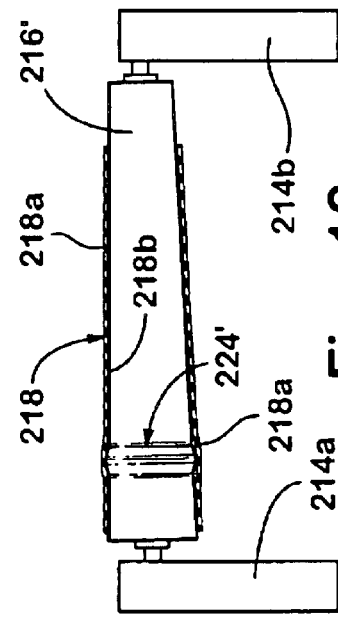
FIG. 18 is the same view as FIG. 17 of an alternate embodiment of a curved belt conveyor in accordance with the present invention.

Optionally, and as shown in FIG. 18, a tracking member or tracking means 224' in accordance with the present invention may include a crown or other sort of raised portion of the roller surface, such that the crown protrudes outwardly from the generally cylindrical or conical roller surface of a roller 216' toward and into engagement with the interior surface 218b of the conveyor belt 218. The tracking means 224' is operable to assist in tracking or maintaining the conveyor belt 218 at the desired and appropriate position about rollers 216'. Similar to tracking member 224, tracking member or tracking means 224' may provide a small enough crown or bump or ridge so that it does not form a bump or ridge on the belt and at the outer surface 218a of the conveyor belt 218.

Figure 19:
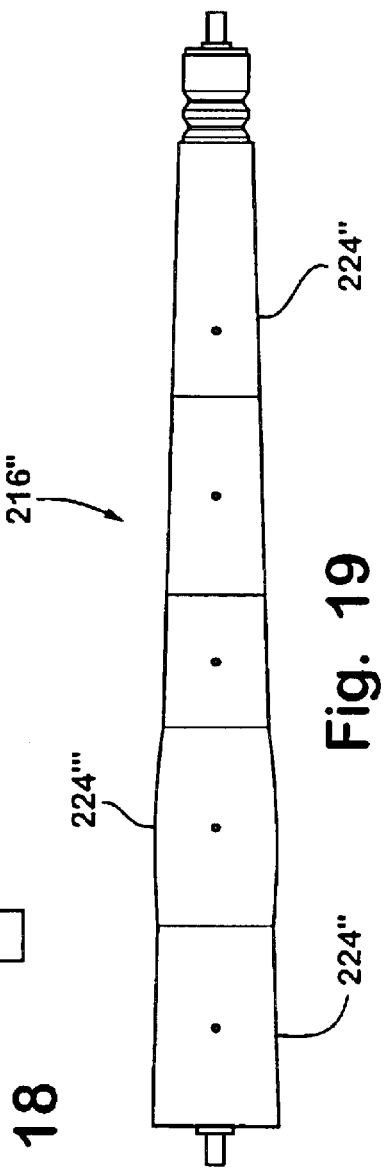
FIG. 19 is a side elevation of a crowned tapered roller useful with the curved belt conveyor of the present invention.

It is further envisioned that the crown or tracking means may be a barrel crown (not shown) extending substantially along the length of the roller, without affecting the scope of the present invention. Optionally, the tracking means may be several crowns or raised portions spaced along a tapered or cylindrical roller. Optionally, and as shown in FIG. 19, it is envisioned that a roller, such as a tapered roller 216', may comprise multiple separate sleeves or sections 224', 224''', which may be assembled to form the roller. Optionally, one or more of the sleeves or sections 224'' may comprise a crowned sleeve or section, while the other sleeves or sections 224''' may comprise straight or uncrowned sleeves or sections.

Conveyor belt 218 thus may be retained or tracked on and around rollers 216, 216', 216'' by tracking means 224, 224', 224'' of roller conveyor 210. The conveyor belt thus is retained or tracked by an internal means, which is within the interface between the rollers and the conveyor belt and laterally within the conveying region defined by the belt. The conveyor belt thus does not have any outer or external tracking or centering devices, which may require modifications to the sidewalls of the conveyor and may interfere with the area around the curved conveyor.

The curved belt conveyor of the present invention thus provides an internal tracking means for tracking the belt on and around the rollers and at, near or within the interface between the belt and the rollers. The tracking means may be substantially contained between the sidewalls of the conveyor and laterally inward of the opposite ends of the rollers. The belt defines a conveying region or surface over the rollers and between the sidewalls of the conveyor, where articles may be positioned on the belt and conveyed along the conveyor by the belt. The tracking means of the present invention may be positioned at least substantially laterally within the inner and outer borders of the conveying region of the belt. In one form of the present invention, the tracking means may comprise a tracking roller or other guiding or tracking device positioned at or near one of the rollers of the conveyor and operable to engage the belt along or near a surface of one of the rollers of the conveyor. The tracking roller may be positioned alongside a lower portion of one of the tapered rollers and operable to engage the lower run of the belt to guide the belt around the tapered rollers.

Optionally, the curved belt conveyor of the present invention may include a tracking means or tracking member positioned on and/or around at least one of the rollers and/or at the interface between the roller surface and the belt which functions to maintain the belt in the desired and appropriate position around the rollers. One or more of the rollers of the conveyor may have a roller surface characteristic, while the interior surface of the belt may have a surface characteristic. The surface characteristics at the interface of the roller and the belt may function to track and guide the belt at the desired or appropriate orientation or location on the roller. The surface characteristics may comprise corresponding ridges, grooves or crowns in or on the respective surfaces of the belt and/or roller, which generally resist lateral movement of the belt along the roller surface. The surface characteristic or tracking means may be a separate component, such as a band or the like, around the roller and between the roller surface and, the interior surface of the belt, without affecting the scope of the present invention. Optionally, the belt may have a stretch quality or characteristic which also functions to track the belt on the rollers.

The curved belt conveyor of the present invention may provide a plurality of independently operable curved zones or segments which may operate together as a generally continuously running curved belt conveyor or may operate individually as an accumulating conveyor with zone control and photo eyes or article sensors. The present invention thus provides a zone controlled curved belt conveyor which may operate in a similar manner as a zone controlled roller conveyor, but which includes a belt around the rollers rather than multiple O-rings or the like connecting the idler rollers to the motorized roller of each zone. The curved belt conveyor of the present invention thus may be capable of accumulating articles on an incline or decline. The belt conveying surface may also facilitate operation of the conveyor at greater speeds over the speed of conventional curved roller conveyors. Also, because the motorized roller of each zone or segment may only control or drive a small belt section, such as a belt around approximately two, three or four rollers, the load and wear on the motorized roller may be minimized to provide a longer life cycle for the motorized roller.

Therefore, the present invention provides a means or device for tracking a belt around at least two rollers of a curved segment or section or zone of a conveyor. The rollers of each zone may include a motorized roller operable to drive the belt around the rollers. The tracking means may maintain or track the belt in its proper position or orientation around the rollers, such that the tracking devices and wider conveyor portions of conventional curved belt conveyors are not required in connection with the curved belt conveyor of the present invention. Because the separate tracking devices are not required to maintain the belt in place on the rollers, the curved belt conveyor of the present invention may be designed within the confines of standard width conveyors and conveyor sidewalls.

Changes and modifications in the specifically described embodiments may be carried out without departing from the principles of the present invention, which is intended to be limited only by the scope of the appended claims, as interpreted according to the principles of patent law.

The embodiments of the invention in which an exclusive property right or privilege is claimed are defined as follows:

1. A curved belt conveyor comprising:
at least two curved zones, each of said zones having a plurality of rollers and a continuous belt reeved around said rollers, said rollers being positioned along and between curved opposite sidewalls, said rollers of each of said at least two zones comprising at least one motorized roller and at least one idler roller, said belts being tracked with said rollers, wherein each of said at least two zones defines a curve of between approximately 10 degrees and approximately 30 degrees.

2. The curved belt conveyor of claim 1, wherein each of said at least two zones defines a curve of approximately 22.5 degrees.

3. The curved belt conveyor of claim 1, wherein each of said at least two zones defines a curve of approximately 15 degrees.

4. The curved belt conveyor of claim 1, wherein said each of said belts is tracked on respective rollers by surface contact with at least one of said rollers.

5. The curved belt conveyor of claim 1, wherein said belts of said at least two zones comprise a low modulus belt material, wherein each of said belts is initially stretched in a lengthwise direction of said belt at least 0.75% when said belt is reeved around said rollers, said belt material functioning to track said belts on said rollers of the respective zones.

6. The curved belt conveyor of claim 1, wherein each of said zones includes at least one tracking roller positioned generally between a pair of said rollers to track said belt with said rollers.

7. The curved belt conveyor of claim 6, wherein an upper surface of said tracking roller engages a lower run of said belt generally between said pair of rollers to track said belt with said rollers while said belt moves around said rollers.

8. The curved belt conveyor of claim 6, wherein said motorized and idler rollers comprise tapered rollers.

9. The curved belt conveyor of claim 8, wherein said tracking roller comprises a generally cylindrical roller angularly positioned along one of said tapered rollers.

10. The curved belt conveyor of claim 6, wherein said tracking roller is adjustably positioned generally between said pair of rollers.

11. The curved belt conveyor of claim 1 including a control which is operable to independently control operation of said at least some of said at least two zones to provide accumulation of articles on said curved belt conveyor.

12. The curved belt conveyor of claim 11 including an article sensor associated with at least some of said at least two zones, wherein said control is operable to independently control operation of said at least some of said at least two zones in response to said article sensors.

13. A curved belt conveyor comprising:
at least one zone having at least two rollers positioned along and between curved opposite sidewalls;
a continuous belt reeved around said rollers; and
a tracking roller positioned generally between a pair of said rollers, said belt extending between said rollers and contacting said tracking roller between said rollers, said tracking roller engaging said belt and being operable to track said belt with said rollers while said belt moves around said rollers of said zone, wherein said tracking roller tracks said belt with said rollers in response to rotation of said rollers in a first direction, and wherein said tracking roller untracks said belt in response to rotation of said rollers in a second direction, said first direction being opposite said second direction.

14. The curved belt conveyor of claim 13, wherein said rollers comprise tapered rollers and said tracking roller comprises a generally cylindrical roller angularly positioned generally along one of said tapered rollers.

15. The curved belt conveyor of claim 14, wherein said tracking roller comprises a shaft portion and a plurality of roller portions rotatably positioned along said shaft portion.

16. The curved belt conveyor of claim 13, wherein said rollers comprise at least one idler roller and a motorized roller operable to drive said belt around said motorized roller and said at least one idler roller.

17. The curved belt conveyor of claim 13, wherein a lower run of said belt extends between said rollers and contacts an upper surface of said tracking roller between said rollers.

18. The curved belt conveyor of claim 13, wherein said tracking roller is adjustably mounted to said conveyor via an adjustment device at opposite ends of said tracking roller.

19. The curved belt conveyor of claim 18, wherein said adjustment device comprises a shaft support for supporting a shaft portion of said tracking roller and a threaded member which is rotatable relative to said shaft support to cause a height adjustment of said shaft support relative to said conveyor sidewalls.

20. The curved belt conveyor of claim 19, wherein said sidewalls, said rollers and said adjustment device are arranged such that said threaded member is rotatable from a location generally above said curved belt conveyor.

21. The curved belt conveyor of claim 13, wherein said at least one zone comprises at least two zones.

22. The curved belt conveyor of claim 21 including a control which is operable to independently control operation of said at least two zones to provide accumulation of articles on said at least two zones.

23. The curved belt conveyor of claim 22 including an article sensor associated with each of said at least two zones, wherein said control is operable to independently control operation of said at least two zones in response to said article sensors.

24. A curved belt conveyor comprising:
at least one zone having a plurality of rollers and a continuous belt reeved around said rollers, said belt defining a conveying region between opposite curved sidewalls; and
tracking means for tracking said belt around said rollers, said tracking means being substantially contained laterally inward of opposite sides of said conveying region.

25. The curved belt conveyor of claim 24, wherein said plurality of rollers comprises a motorized roller and at least one idler roller.

26. The curved belt conveyor of claim 24, wherein said plurality of rollers comprise a plurality of tapered rollers.

27. The curved belt conveyor of claim 26, wherein said tracking means comprises a tracking roller positioned generally along one of said plurality of rollers and between said plurality of rollers, said belt being reeved around said tapered rollers and in contact with an upper portion of said tracking roller.

28. The curved belt conveyor of claim 27, wherein said tracking roller is oriented generally along one of said plurality of tapered rollers.

29. The curved belt conveyor of claim 24, wherein said tracking means is at the interface between said belt and said rollers.

30. The curved belt conveyor of claim 29, wherein said tracking means comprises at least one of a roller surface characteristic at an outer surface of at least one of said rollers and a belt surface characteristic at an interior surface of said belt.

31. The curved belt conveyor of claim 29, wherein said tracking means comprises a low modulus characteristic of said belt, said belt being initially stretched in a lengthwise direction of said belt at least 0.75% when said belt is reeved around said rollers.

32. The curved belt conveyor of claim 29, wherein said tracking means comprises at least one raised crown protruding outwardly from said outer surface of said at least one of said rollers and into engagement with said interior surface of said belt.

33. The curved belt conveyor of claim 29, wherein said tracking means comprises a generally flat band positioned around said at least one of said rollers between said outer surface of said at least one of said rollers and said interior surface of said belt.

34. A curved belt conveyor comprising:

at least two curved zones, each of said at least two zones being defined by a motorized roller and at least one idler roller positioned along and between opposite sidewalls of said conveyor and a continuous belt reeved around said motorized roller and said at least one idler roller, said motorized roller being operable to drive said belt around said rollers to move articles along the respective zone, said belt having a low modulus characteristic, wherein said belt is initially stretched in a lengthwise direction of said belt at least 0.75% when said belt is reeved around said rollers, said low modulus characteristic of said belt functioning to track said belt on said rollers.

35. The curved belt conveyor of claim 34, wherein said belt is initially stretched in a lengthwise direction of said belt at least 1% when said belt is reeved around said rollers.

36. The curved belt conveyor of claim 34, wherein said belt is initially stretched in a lengthwise direction of said belt at least 1.5% when said belt is reeved around said rollers.

37. The curved belt conveyor of claim 34, wherein said low modulus characteristic of said belt provides at least a 2% stretch characteristic to said belt.

38. The curved belt conveyor of claim 34, wherein said low modulus characteristic of said belt provides at least a 4% stretch characteristic to said belt.

39. The curved belt conveyor of claim 34 including a generally flat band positioned around at least one of said rollers and positioned between an outer surface of said at least one of said rollers and said interior surface of said belt.

40. The curved belt conveyor of claim 34, wherein at least one of said rollers includes a raised portion or crown protruding outwardly from an outer surface of said at least one of said rollers and into engagement with an interior surface of said belt.

41. A curved belt conveyor comprising:

at least two curved accumulation sections spaced in a conveying direction, each of said at least two curved accumulation sections having a plurality of rollers and a continuous belt reeved around said rollers, at least one of said plurality of rollers comprising a motorized roller operable to drive said belt to move articles along the respective curved accumulation section, each of said at least two curved accumulation sections including a product sensor for sensing product on said belt of the respective curved accumulation section, wherein said curved belt conveyor accumulates product on said curved accumulation sections.

42. The curved belt conveyor of claim 41, wherein each of said curved accumulation sections includes at least one tracking roller positioned generally between a pair of said plurality of rollers.

43. The curved belt conveyor of claim 42, wherein an upper surface of said tracking roller engages a lower run of said belt between the lower surfaces of said plurality of rollers to track said belt.

44. The curved belt conveyor of claim 42, wherein said tracking roller comprises one of a tapered roller and a segmented roller having a shaft portion and a plurality of roller segments rotatably positioned along said shaft portion.

45. The curved belt conveyor of claim 41, wherein said belt of each of said curved accumulation section is tracked with said rollers by surface contact with at least one of said plurality of rollers.

46. The curved belt conveyor of claim 45, wherein said belt defines a conveying region for conveying articles along said curved accumulation section, said surface contact being substantially contained laterally inward of opposite sides of said conveying region.

47. The curved belt conveyor of claim 41 including a control which is operable to independently control operation of said at least two sections to provide accumulation of articles on said curved belt conveyor.

48. A curved belt conveyor comprising:

at least two tapered rollers positioned along and between curved opposite sidewalls;

a continuous belt reeved around said tapered rollers and having an upper conveying run and a lower return run; and a tracking roller positioned generally between two of said tapered rollers, said tracking roller comprising a segmented tracking roller having a shaft portion and a plurality of roller portions rotatably positioned along said shaft portion, said tracking roller engaging said lower return run of said belt and tracking said belt with said tapered rollers while said belt moves around said at least two tapered rollers.

49. The curved belt conveyor of claim 48, wherein said tracking roller comprises a generally cylindrical segmented roller angularly positioned generally along one of said tapered rollers.

50. The curved belt conveyor of claim 48, wherein said tracking roller is positioned generally along one of said tapered rollers.

51. The curved belt conveyor of claim 48, wherein one of said tapered rollers comprises a motorized roller.

52. The curved belt conveyor of claim 48, wherein said tracking roller is adjustably mounted to said conveyor via an adjustment device at opposite ends of said tracking roller.

* * * * *

UNITED STATES PATENT AND TRADEMARK OFFICE
CERTIFICATE OF CORRECTION

PATENT NO. : 6,971,510 B2  
APPLICATION NO. : 10/411757  
DATED : December 6, 2005  
INVENTOR(S) : David H. Cotter et al.

It is certified that error appears in the above-identified patent and that said Letters Patent is hereby corrected as shown below:

Column 13:  
Line 6, "FIG. 1" should be --FIG. 11--.

Column 15:  
Line 44, "216'" should be --216"--.  
Line 45, "224'" should be --224"--.

Signed and Sealed this

Seventeenth Day of June, 2008

JON W. DUDAS  
*Director of the United States Patent and Trademark Office*

UNITED STATES PATENT AND TRADEMARK OFFICE
CERTIFICATE OF CORRECTION

PATENT NO. : 6,971,510 B2
APPLICATION NO. : 10/411757
DATED : December 6, 2005
INVENTOR(S) : David H. Cotter et al.

It is certified that error appears in the above-identified patent and that said Letters Patent is hereby corrected as shown below:

Column 13:
Line 6, "FIG. 1" should be --FIG. 11--.

Column 15:
Line 44, "216' " should be --216"--.
Line 45, "224' " should be --224"--.

Signed and Sealed this

Twelfth Day of August, 2008

JON W. DUDAS
*Director of the United States Patent and Trademark Office*